(12) United States Patent
Fa

(10) Patent No.: US 6,801,022 B2
(45) Date of Patent: Oct. 5, 2004

(54) UNIVERSAL ELECTRICAL ENERGY SAVER

(76) Inventor: George Fa, 400, Bentley st., Markham, Ontario (CA), L3R 8H6

( * ) Notice: Subject to any disclaimer, the term of this patent is extended or adjusted under 35 U.S.C. 154(b) by 29 days.

(21) Appl. No.: 10/378,142

(22) Filed: Mar. 4, 2003

(65) Prior Publication Data

US 2004/0174143 A1 Sep. 9, 2004

(51) Int. Cl.$^7$ .................................................. G05F 1/70
(52) U.S. Cl. ........................................ 323/208; 323/266
(58) Field of Search ................................ 323/208, 209, 323/266, 299

(56) References Cited

U.S. PATENT DOCUMENTS

| | | | | |
|---|---|---|---|---|
| 4,533,986 A | * | 8/1985 | Jones | 363/17 |
| 4,551,603 A | * | 11/1985 | Rocklin | 219/76.13 |
| 5,528,123 A | | 6/1996 | Hutchison | |
| 5,583,423 A | | 12/1996 | Bangerter | |
| 5,637,989 A | * | 6/1997 | Wood | 323/223 |
| 5,670,864 A | * | 9/1997 | Marx et al. | 323/211 |
| 5,754,036 A | | 5/1998 | Walker | |
| 5,808,454 A | | 9/1998 | Chung | |
| 5,880,677 A | | 3/1999 | Lestician | |
| 6,191,563 B1 | * | 2/2001 | Bangerter | 323/211 |
| 6,252,311 B1 | | 6/2001 | West | |

\* cited by examiner

Primary Examiner—Bao Q. Vu

(57) ABSTRACT

A universal electric energy saver to recuperate power losses comprised of a bank of condensers connected in parallel; a bank of resistors with some connected in parallel while others are connected in series; a transformer to step down the voltage to power up a small electronic circuit board which serves to absorb the lost power and protect the rest of the circuitry against overload; a line plugging into a power outlet to connect the universal electrical energy saver with the rest of the electrical circuit.

Figure 1:
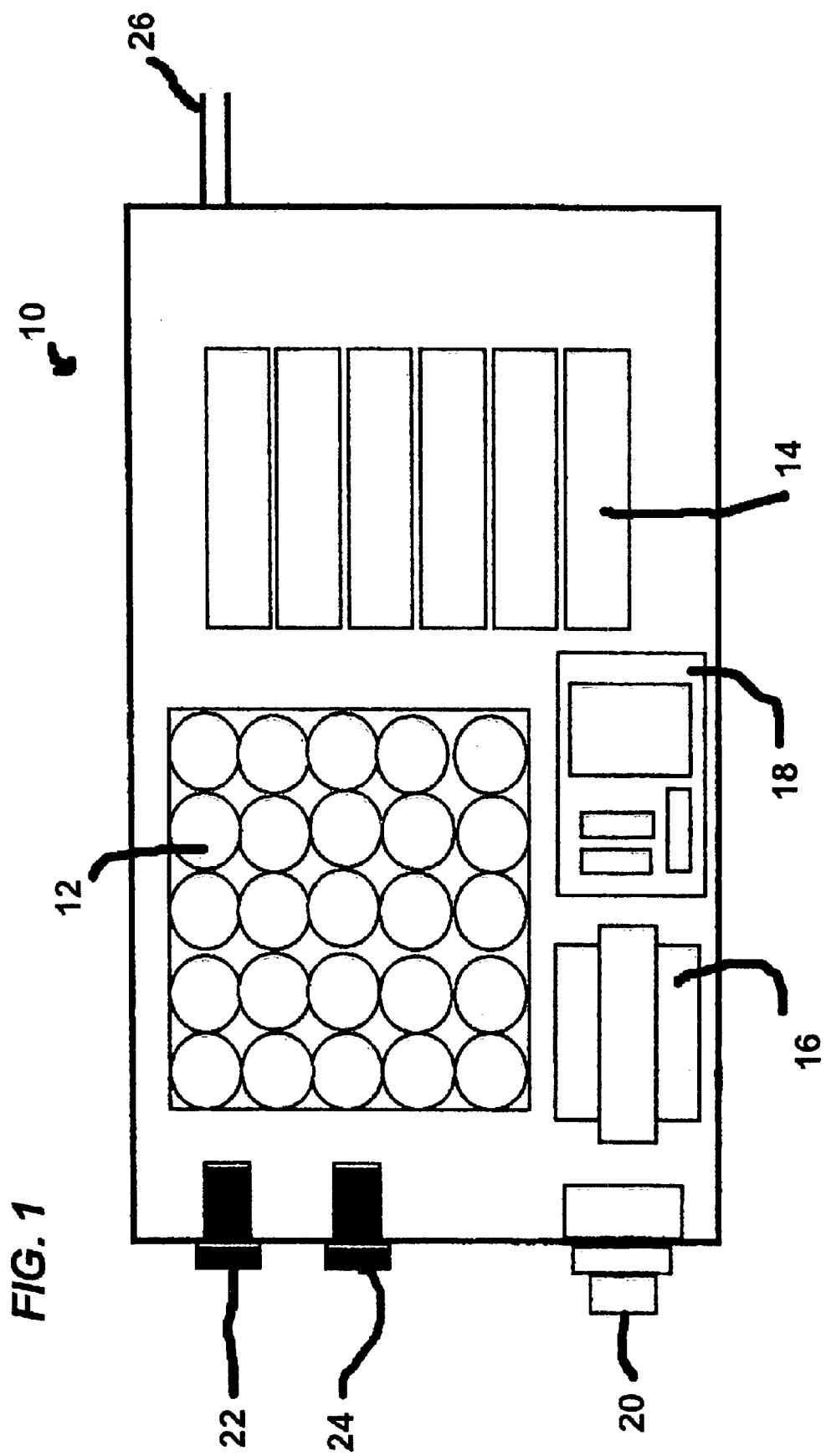

2 Claims, 4 Drawing Sheets

UNIVERSAL ELECTRICAL ENERGY SAVER

BACKGROUND OF THE INVENTION

1. Field of the invention

This invention relates generally to electrical and electronic circuitry devices but more particularly to a device which reduces electrical energy consumption in an electrical circuit.

2. Background

Ever since the price of energy skyrocketed in the 1970s, inventors have been busy coming up with various ways to save energy. Since a lot of the electricity we use is produced by way of fossil fuel, the very same source of energy which has increased so much in cost, the cost of electrical energy production has followed the pattern. It is no surprise then that a number of inventions concern themselves with the economy of electricity.

There are many ways of saving electricity but this instant invention concerns itself not so much with making appliances more economical but rather with increasing the efficiency of the local electric grid, i.e. the electric circuit of a unit such as a house or building. A similar approach has been taken by some of the prior art studied, for example:

U.S. Pat. No. 5,528,123 by Hutchison discloses a power circuit for supplying electrical energy that comprises a power factor corrector, a current sensing transformer, a rectifier bridge, a capacitor and a power factor corrector control loop. The current sensor measures the total current drawn by both the DC power supply and the AC loads, and the power factor corrector corrects total line current drawn from the wall plug through the power cord so that it approaches a unity power factor, i.e. the current being sinusoidal and in phase with the line voltage. Only when equipment is plugged directly into one or more of the invention's power outlets that energy savings occur.

U.S. Pat. No. 5,583,423 by Bangerter presents an electronic apparatus and methods for AC power regulation primarily intended for inductive loads (fluorescent lights, motors, etc.). The apparatus provides substantial reduction in power consumption while also providing a leading power factor, reduced harmonic distortion, and reduced noise. The system is self-adjusting for a wide range of loads and can reduce power consumption by 25% in lighting loads. The system utilizes a triac and parallel capacitor bank in series with the load. The capacitor absorbs the inductive turn-off voltage spike caused by the collapsing magnetic field in the ballast. This invention is ideal in a large manufacturing plant setting, a wharehouse or office building where a large amount of fluorescent ligths are used and where large electrical motors or transformers are used and is therefore not useful for residential housing.

U.S. Pat. No. 5,754,036 by Walker describes an apparatus and methods for AC power regulation for a wide range of complex capacitive and inductive loads which provide substantial reduction in power consumption while also providing a leading power factor. This patent seems to be an improvement over the previous patent. The apparatus includes a power measurement circuit, a current measurement circuit, a phase measurement circuit, and a capacitor bank. This system is used mainly for lighting, both fluorescent and incandescent.

U.S. Pat. No. 5,808,454 by Chung exposes an alternating current power control device. The device having a constant voltage function for maintaining a constant output voltage although an input voltage is varied, if a desired voltage is set in respect to a load, thus providing a power saving effect, power stability and reliability. The device includes a single-winding transformer, a phase comparison controller, a variable resistor, a current comparator and a mutual induction reactor.

U.S. Pat. No. 5,880,677 by Lestician discloses a system for monitoring and controlling electrical power consumption that can be retrofitted to a typical consumer power arrangement. The system includes a control unit which receives information from an electromagnetic pickup device from which real time electrical consumption is determined over short periods of time. The control unit can then send signals to diverse modules that have filters which release electrical power to the individual electrical devices, appliances and outlets at a controlled, economic rate. The modules are a combination of a circuit coupled with a series of electronic metal oxide varistors. The modules will save energy by reducing and filtering the naturally created harmonic noise in an electrical device. The harmonic noise is not only reduced, but the module also balances the electrical phases of the device it is controlling. The two functions can reduce the electrical consumption of most electrical devices by 15 to 35%. A module may include the following components: a microcomputer control chip, a relay switch, a conditioning circuit, a capacitor, an inductor, and a metal oxide varistor. Only appliances directly connected to one of the control units can benefit from the system.

U.S. Pat. No. 6,252,311 by West presents a load sensor and controller manager. The apparatus is well suited for managing numerous appliance loads commonly found in residential dwellings. When loads are delivered to certain appliances, loads to different other appliances are delayed. The invention provides a sensor/controller/manager module capable of detecting initial current flow across a load's open/close switch. The invention can actually cut power to certain appliances in order to delay their start in order to eliminate power usage spikes.

The above cited prior art suffers from certain limitations such as the type of equipment from which energy saving can occur or the fact that the equipment has to be directly connected to the energy saving units or even the risk of delaying the start of certain appliances in order to control electrical flow.

SUMMARY OF THE INVENTION

A first object of the present invention is to provide a Universal Energy Saver (UES) system that is plugged in a single conventional electrical plug outlet.

A second object of the present invention is to provide a Universal Energy Saver (UES) that absorbs power losses from domestic electrical home appliances and lights.

A final object of the present invention is a Universal Energy Saver (UES) that acts as a voltage stabilizer for the normal flow of incoming electrical current supplied by the power utility company.

In order to do so, the present invention includes an electronic capacitance circuit board, a transformer, a protection circuit board and a resistor for electrical consumption load.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 schematic view of the circuit board.

Figure 2:
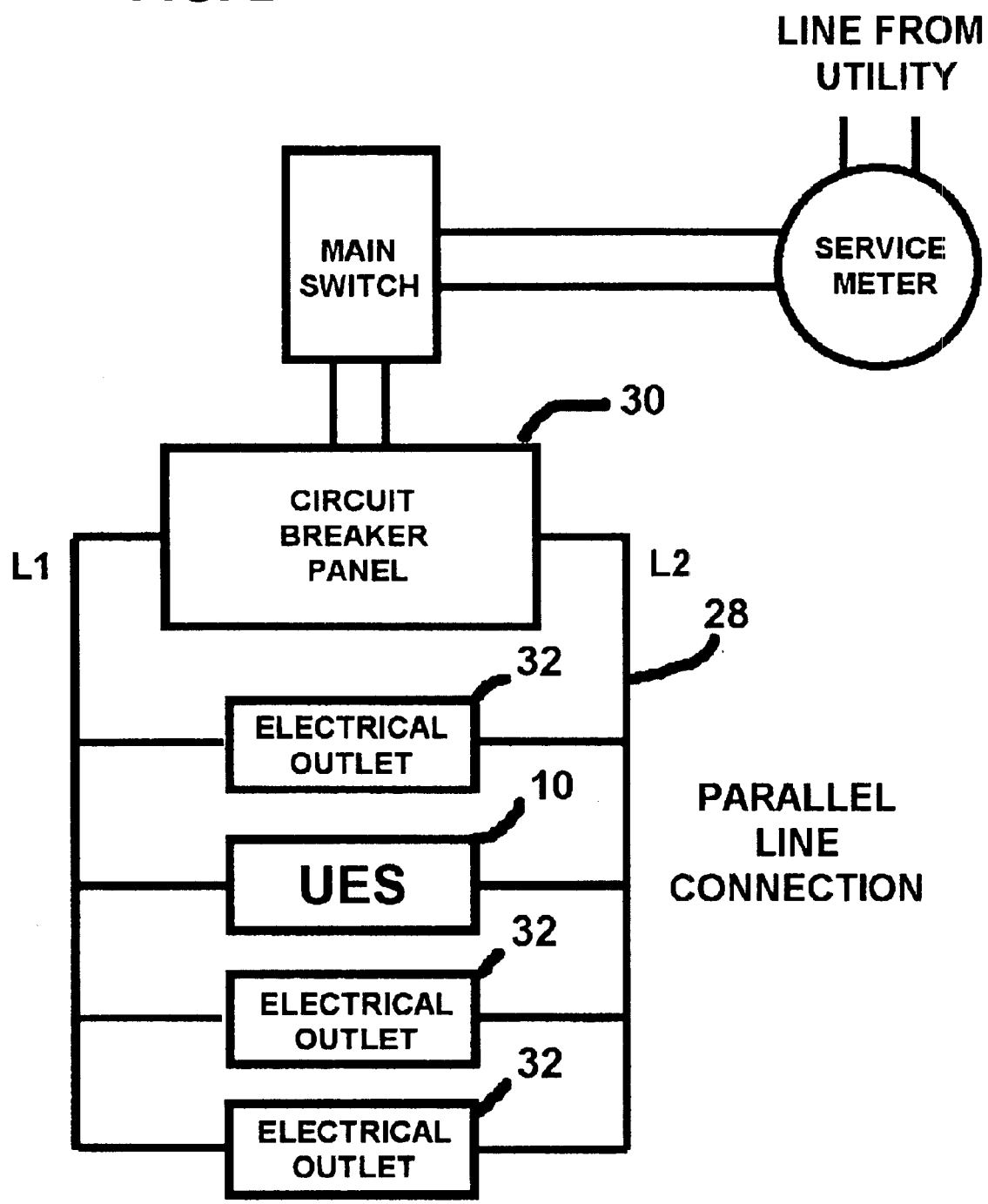

FIG. 2 diagram of installation in a typical household circuit.

Figure 3:
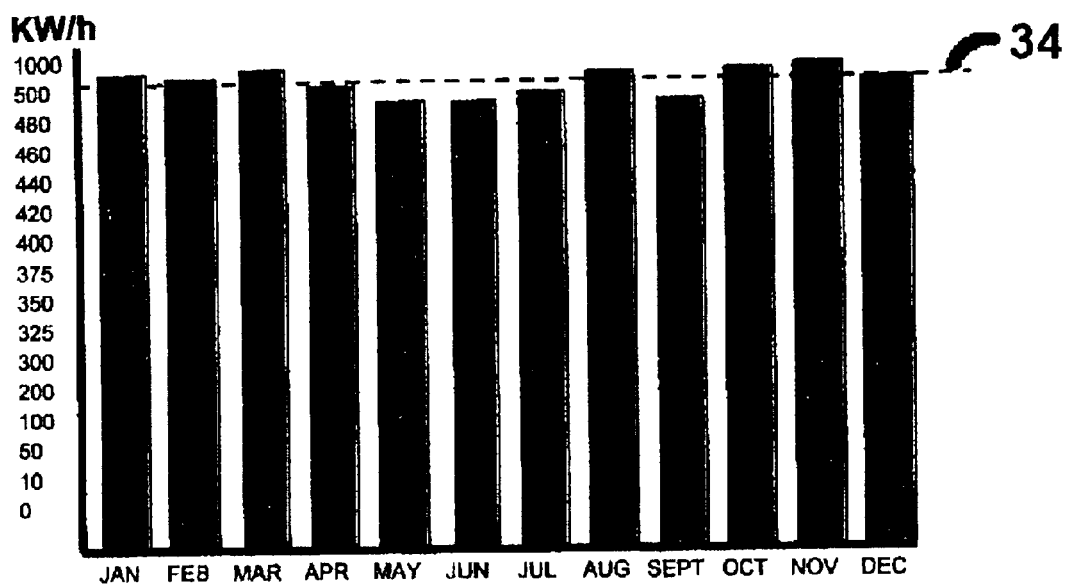

FIG. 3 graph showing 1 year actual electrical consumption in a test household without the UES.

Figure 4:
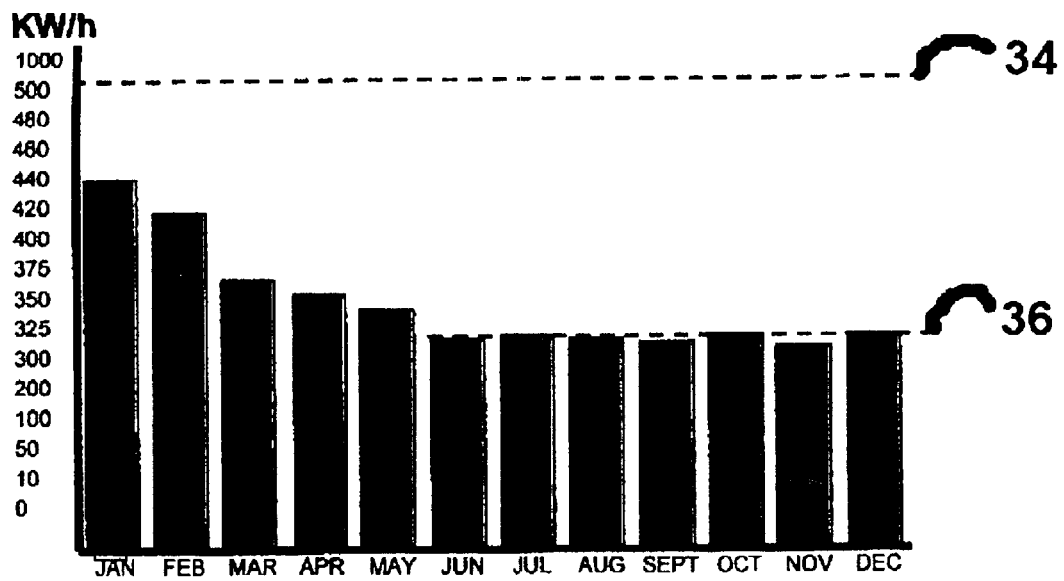

FIG. 4 graph showing 1 year actual electrical consumption in the same household the following year with the UES.

Figure 5:
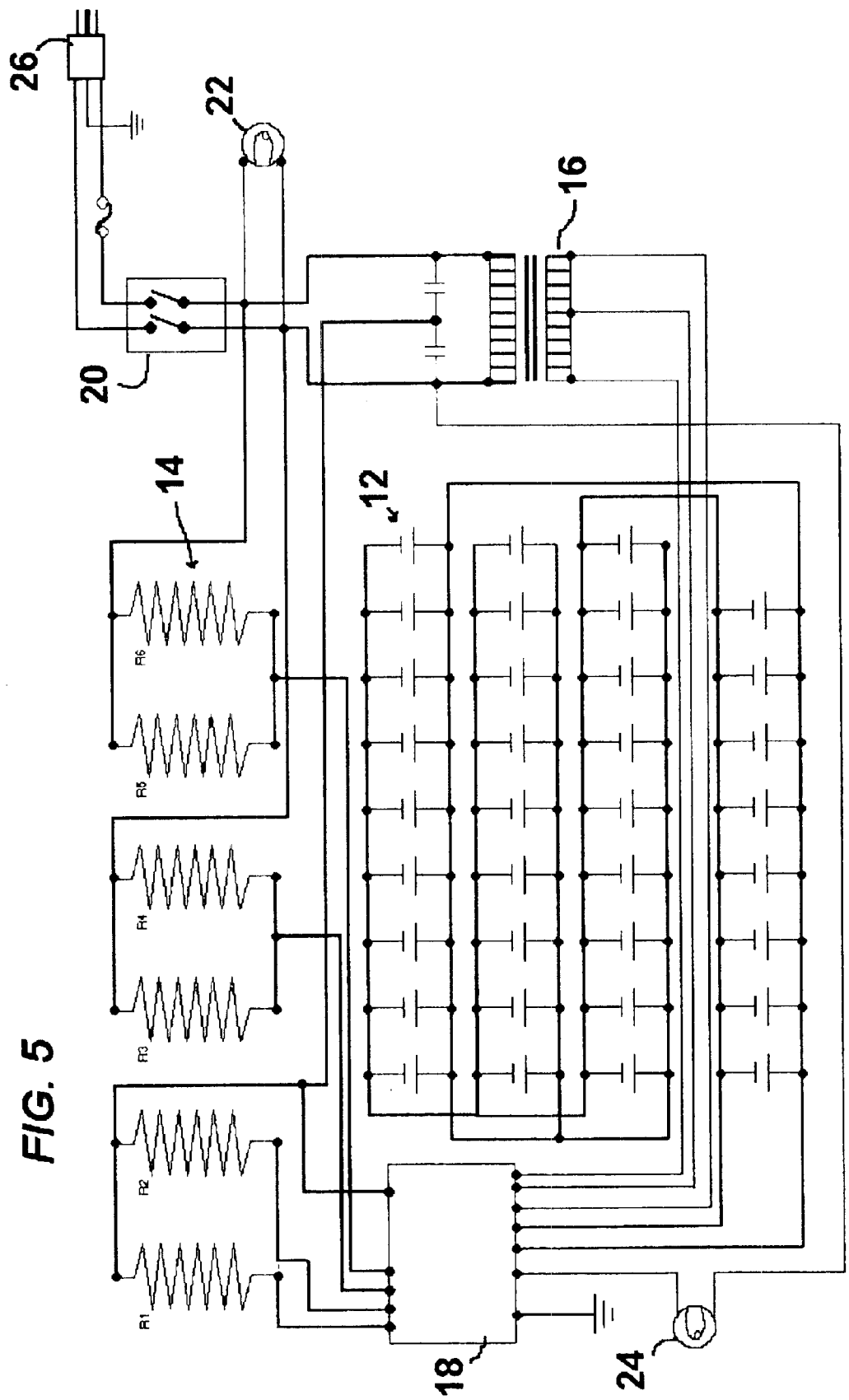

FIG. 5 diagram of the circuitry.

DETAILED DESCRIPTION OF THE PREFERRED EMBODIMENT

FIGS. 1, 5 This schematic view of the circuit board of the UES (10) shows the main components which are:

A bank of condensers (12) connected in parallel, a bank of 6 resistors (14) with R1 and R2 connected in parallel while R3, R4 and R5, R6 are connected in series as seen more particularly in FIG. 5, a transformer (16) to step down the voltage to 12 VAC strictly to power up a small electronic circuit board (18) which serves to absorb the lost power and protect the rest of the circuitry against overload. Other components include a power switch (20) a power on LED (22) an overload warning light (24) and a line (26) that plugs into an ordinary outlet, which is how the UES connects with the rest of the circuit in order to affect the power savings.

The UES (10) works by accumulating a large amount of electricity into its condensers (12) thus providing available power when there is a surge in demand such as when an appliance starts. Also, since incoming electricity from a utility company is not always regular, having surges and dips and all kinds of variations, the UES (10) alleviates those variations. Also, because of the nature of alternating current and the way it interacts with various components, particularly those having induction as well as transient interference and electrical wiring resitance, all these factors combine to create power losses of which about 90% can be recuperated by the UES.

FIG. 2 This diagram shows where the UES (10) is situated inside a typical household circuit (28). The UES (10) can be plugged into any single outlet of a household after the circuit breaker panel (30) and its effect will be felt throughout the circuit (28). All other items connected to any other electrical outlet (32) benefits from the UES (10).

FIG. 3 This graph shows 1 year actual electrical consumption in a test household without the UES (10). The dotted line (34) shows the average consumption over a one year period.

FIG. 4 This graph shows 1 year actual electrical consumption the following year in the same household with last year's average dotted line (34) for reference. A second lower dotted line shows the average with the UES (36). It is interesting to note that it can take as much as six months for the UES to become fully functional. It appears that the overall conditioning of the circuit (28) makes the appiances better tuned. This effect is somewhat surprising and has not been fully studied.

What is claimed is:

1. A universal electrical energy saver to recuperate power losses comprising:

a bank of condensers connected in parallel;

a bank of resistors a number of which are connected in parallel while the remainders are connected in series;

a transformer to step down the voltage to power up a small electronic circuit board which serves to absorb the lost power and protect the rest of the circuitry against overload;

a line plugging into a power outlet to connect the universal electrical energy saver with the rest of the electrical circuit.

2. A universal electrical energy saver (UES) to recuperate power losses having the following method of use:

the UES is plugged into any single power outlet of a household after the circuit breaker panel and its power switch is set to on.

* * * * *